Aug. 30, 1932.  J. H. CAMPBELL  1,873,994
INTERNAL COMBUSTION ENGINE
Filed Dec. 15, 1923   7 Sheets-Sheet 1

Fig.1

Inventor
James H. Campbell
by Roberts Roberts Cushman
Attorneys

Aug. 30, 1932.  J. H. CAMPBELL  1,873,994
INTERNAL COMBUSTION ENGINE
Filed Dec. 15, 1923  7 Sheets-Sheet 6
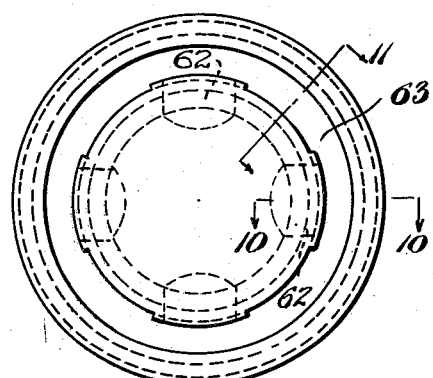
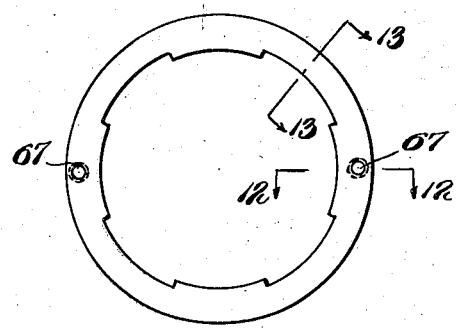
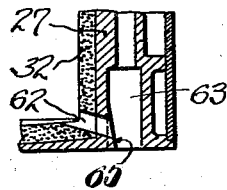 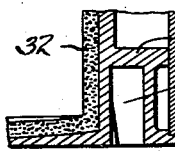 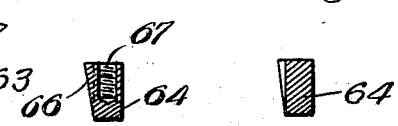
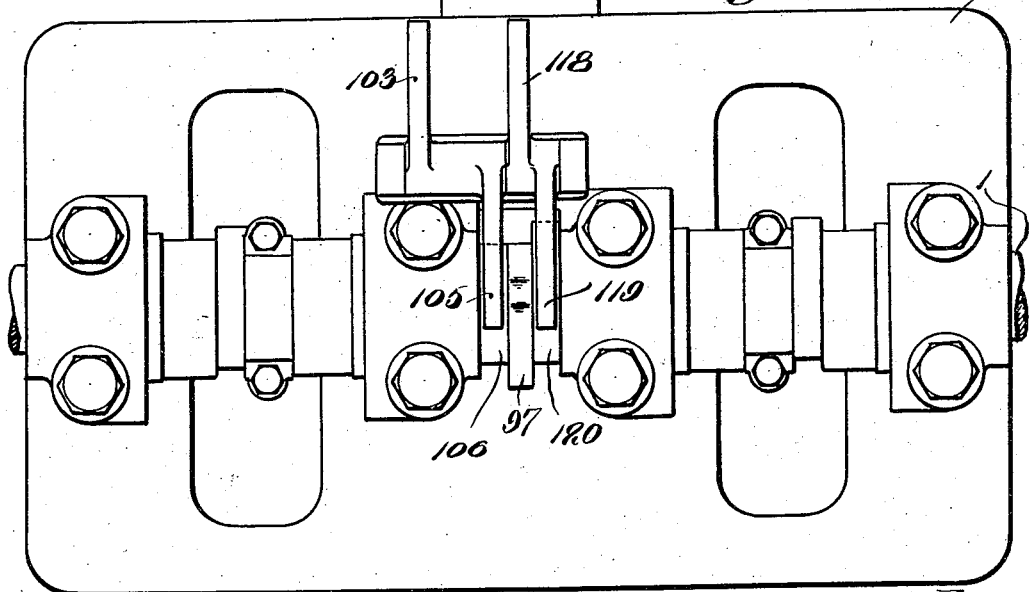
Inventor
James H. Campbell Aug. 30, 1932.   J. H. CAMPBELL   1,873,994
INTERNAL COMBUSTION ENGINE
Filed Dec. 15, 1923   7 Sheets-Sheet 7
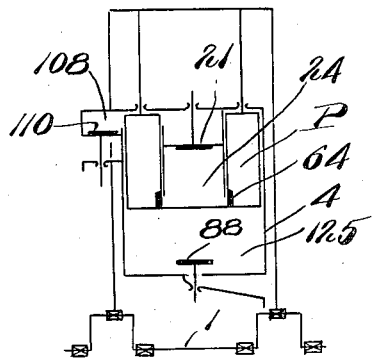
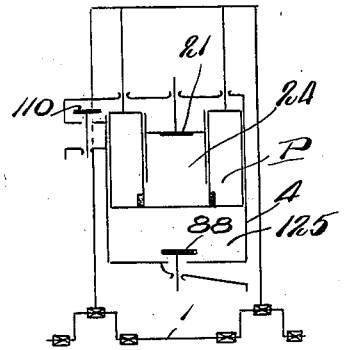
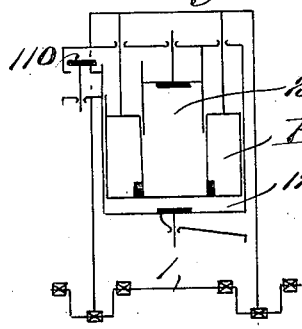
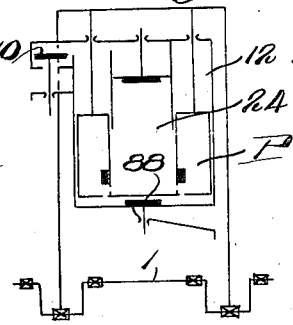
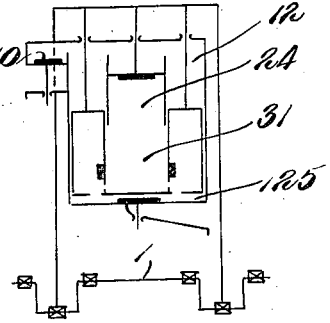
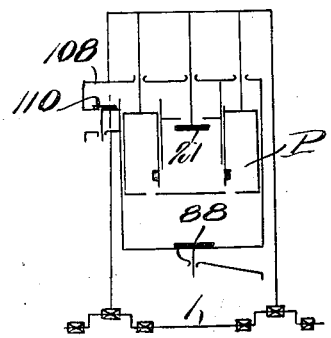
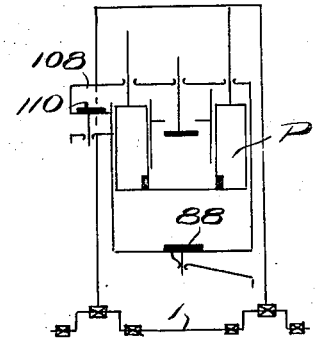
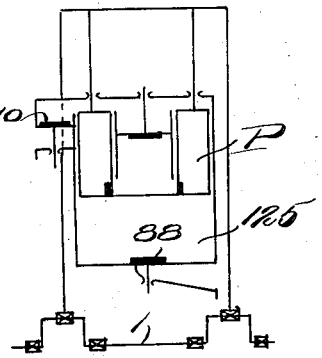
Inventor
James H. Campbell
by Roberts Roberts & Cushman
Attorneys Patented Aug. 30, 1932

1,873,994

UNITED STATES PATENT OFFICE

JAMES H. CAMPBELL, OF CAMBRIDGE, MASSACHUSETTS, ASSIGNOR OF ONE-HALF TO JAMES D. MOORE, OF BOSTON, MASSACHUSETTS

INTERNAL COMBUSTION ENGINE

Application filed December 15, 1923. Serial No. 680,887.

This invention pertains to internal combustion engines, and particularly to engines working upon a two-stroke cycle.

With the general object of designing an engine of high thermal efficiency capable of meeting the requirements of the automobile manufacturer I have devised a new type of internal combustion engine which to a marked degree exhibits the characteristic good qualities of engines of both the two-cycle and the four-cycle types together with other improved mechanical and functional advantages and utilities not heretofore found in any type of engine known to me, while at the same time I have eliminated from my new engine most of the undesirable characteristics of former types of engines.

While my new engine is radically different in many respects from engines heretofore known to me, it appears more closely to resemble the two-cycle type than any other, and while according to a strict terminology it should probably be designated as a two-cycle double expansion, double acting engine, I prefer for the sake of brevity to refer to it herein as of two-cycle type, although this term is to be understood as a general and not a specific characterization of my engine as hereinafter more specifically described.

In accordance with my invention I employ a cycle of operations involving the following steps. First a fresh charge of explosive mixture, such for example as air and a volatile hydrocarbon, is ignited while under compression in the combustion chamber of the engine and the resulting expansion of the burnt gases moves the piston on the forward working stroke. During the forward working stroke of the piston a fresh charge of combustible mixture at low (atmospheric) pressure is drawn into a compression chamber. As the piston nears the end of its forward working stroke, the partially expanded exploded charge is transferred to the opposite or rear side of the piston head where it expands still further, acting upon a larger piston area to drive the piston back on its return working stroke during which the fresh charge is first compressed and then transferred to the combustion chamber ready to be fired at the beginning of the next cycle. As the fresh charge enters the combustion chamber it expels what little remains of the previous burnt charge.

The port leading from the combustion chamber is closed after the scavenging of the previous charge is completed, while the port leading into the combustion chamber is closed prior to the next ignition. During the forward working stroke the doubly expanded gas of the previous charge is expelled from the secondary expansion chamber at the rear side of the piston, the exhaust port preferably closing just prior to the end of the forward working stroke so that a portion of the gas is entrapped at the rear of the piston, taking up the inertia and cushioning the reciprocating parts, thus avoiding waste of energy and lessening wear in the bearings.

Preferably the combustion chamber, the expansion chambers, and the compression chamber are so arranged relatively to each other that but a single piston is necessary. The walls of the combustion chamber and the expansion chambers are lined on the inside with a refractory heat insulating material, and in accordance with my preferred arrangement the piston is so disposed and shaped that its packing rings engage surfaces which are comparatively cool and which are not exposed to the flame of the burning charge. The engaging surfaces may thus readily be lubricated. The piston rod passes through a relatively cool chamber making it unnecessary to cool it artificially. This arrangement permits me to dispense with the common practice of artificially cooling the cylinder walls which carries off a large percentage of the sensible heat of the fuel, and instead of losing heat by the employment of cooling devices, I conserve the heat as far as possible, utilizing it for expanding the burnt charge and thus increasing the pressure on the piston.

In accordance with the improved cycle above described, I secure almost perfect scavenging of the combustion chamber without substantial loss of the fresh charge; I obtain a much higher power per unit volume of piston displacement than is possible even in two-cycle engines of usual type, due to the repeated use or multiple expansion of the exploded charge, the latter action also tending to produce an unusually uniform driving torque; I substantially eliminate lubrication troubles; do away with artificial cooling thus obtaining a higher thermal efficiency than has heretofore been thought possible, and am enabled so to time the valves and associated parts as to assure proper operation of the engine even at the highest speeds.

In the accompanying drawings I have shown by way of example a preferred embodiment of means suitable for carrying my invention into effect, and in such drawings:

Fig. 1 is a front elevation partly in section of a one cylinder engine embodying my invention; the usual auxiliary and accessory devices being omitted;

Fig. 6 is a bottom plan view of the engine;

Fig. 8 is a bottom plan view of the lower end of the engine cylinder, the crank case being removed;

Fig. 9 is a top plan view of an annular valve forming an element of the engine structure;

Fig. 10 is a fragmentary vertical section on the line 10—10 of Fig. 8;

Fig. 11 is a fragmentary vertical section on the line 11—11 of Fig. 8;

Fig. 12 is a vertical section on the line 12—12 of Fig. 9;

Fig. 13 is a vertical section on the line 13—13 of Fig. 9; and

Figure 2:
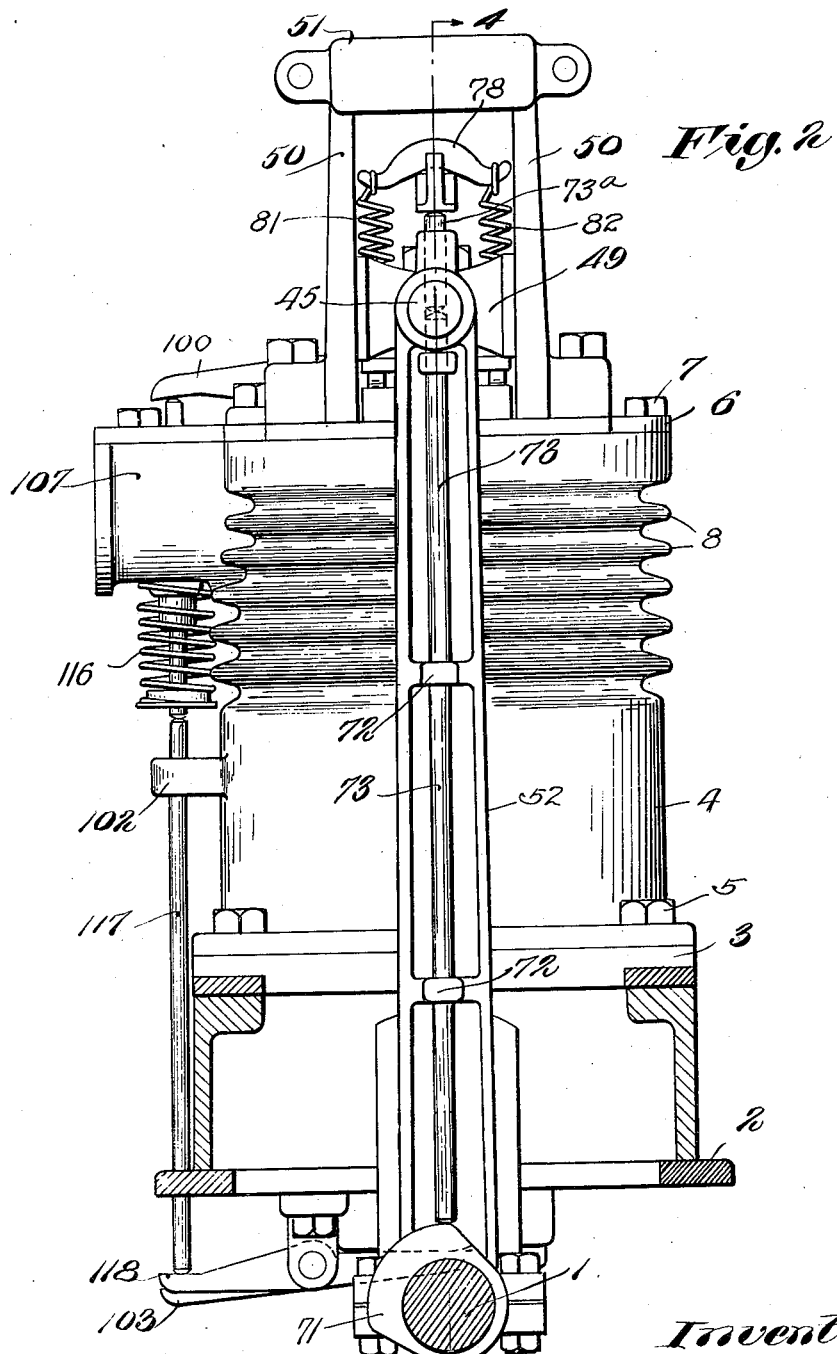
Fig. 2 is a side elevation of the engine shown in Fig. 1 viewed from the right-hand side of the latter.

Figs. 14–21 inclusive are diagrams illustrating the cycle upon which the engine operates.

Referring to the drawings (Figs. 1, 2, 3, 4 and 7) the numeral 1 indicates a crank shaft journaled to turn in bearings in a suitable base 2. The base supports a plate 3 which constitutes the lower head of a cylinder 4 which is attached to the lower head by means of bolts 5. The upper end of the cylinder 4 is closed by a head 6 secured in position by means of bolts 7.

The exterior surface of the cylinder at its lower portion may if desired be substantially smooth, but at its upper portion the exterior surface is preferably provided with heat radiating ribs or projections 8. The interior surface of the cylinder at its lower part is provided with a shallow, axially elongate circumferential recess which is filled with some heat insulating material such for example as asbestos fiber indicated at 9. This insulating material is retained in position by means of a cylindrical shell 10, preferably of sheet metal, which forms a lining for the cylinder at its lower portion and whose upper and lower ends are received in rebates formed at the top and bottom edges of the recess which holds the insulating material.

The upper head 6 has a central opening from the edge of which an integral sleeve-like member 11 projects inwardly into the cylinder, the member 11 being concentric with and spaced from the inner wall of the latter to provide the annular compression chamber 12. A hollow cylindrical block or plug 13 (Figs. 3, 4 and 7) is fitted within the upper portion of the sleeve 11. The block 13 has the bottom wall 14 provided with a valve port 15 hereinafter termed the secondary inlet port. The space 16 within the hollow block communicates freely by means of open passages 17 (Figs. 4 and 7) with the annular chamber 12. The upper end of the block 13 is closed by a wall 18 which is provided with a guide member 19 having a bore for the reception of the stem 20 of a valve 21, which cooperates with the port 15 for closing the latter. A spring 22 bearing against a collar 23 on the valve stem 20 normally keeps the valve 21 closed.

The block 13 which closes the upper end of the sleeve 11 may be provided with a socket opening 121 for the reception of a spark plug 121ª (Fig. 3) of suitable type.

The lower portion of the space within the sleeve 11 constitutes a combustion chamber 24. This chamber is preferably furnished with a lining shell 25 of some hard, shape-retaining, coherent and rigid refractory and heat insulating material, such for example as the substance commercially known as "lava" which is a form of magnesium silicate or steatite, vitrified at a temperature of approximately 2000° F. This shell may conveniently be molded or turned to shape and is fitted within the sleeve 11 before the introduction of the block 13. The lower edge of the lining shell 25 rests upon a flange 26 projecting inwardly from the lower edge of the sleeve 11, and the block 13 rests upon the upper end of the lining shell, being secured in place in any desired manner.

A piston reciprocates within the cylinder 4. This piston comprises a cup-like core 27 having the head portion 28 with side walls constituting an annular body rising therefrom. The side walls of the core are preferably provided with circumferential recesses 29 (Figs. 3 and 4) separated by ribs which support an outer shell 30 preferably of sheet metal which forms the outer surface of the piston. This shell may be formed of sheet material and is opposed to the interior surface of the shell 10 forming the lining for the cylinder. The space 31 within the hollow piston constitutes a primary expansion chamber which is preferably furnished with a lining consisting of a cup-like shell 32 of refractory material such as that employed for lining the combustion chamber, the head or end portion of the lining being indicated at 33 as resting upon the upper face of the piston head. The interior diameter of the lining shell 32 is slightly greater than the exterior diameter of the sleeve 11, so that the piston is free to reciprocate in the annular space 12. At its upper edge the piston is provided with a ring 34 which is grooved internally and externally for the reception of packing rings 35 and 36 respectively. The packing rings 35 engage the exterior surface of the sleeve 11, while the rings 36 engage the interior surface of the cylinder 4 at its upper part.

At diametrally opposite points the core 27 of the piston is furnished with threaded openings for the reception of the lower ends of the tubular piston rods 37 and 38 (Fig. 4) respectively. These rods extend upwardly through the annular compression chamber 12 and out through suitable openings in the upper head 6 of the cylinder. Annular flanges 39 (Fig. 4) project upwardly from the head 6 surrounding the openings therein. Glands 40 are seated within the respective flanges, being retained in position in any desired manner. The glands embrace the respective piston rods and compress suitable packing material 41 in the space within the flanges 39.

The upper ends of the piston rods are reduced in diameter as shown at 42, thus providing shoulders 43 spaced from their extremities and their outer ends are screw threaded for the reception of nuts 44. The reduced ends of the piston rods are disposed in diametral openings in a wrist pin 45, and are clamped thereto by the nuts 44. The wrist pin is journaled at the points 46 and 47 (Fig. 4) in bearings furnished in cross heads 48 and 49 which are guided for vertical movement by the uprights 50 mounted upon the upper head 6. These uprights are arranged in pairs and spaced apart to furnish proper guideways for the cross heads. The uprights are preferably united at their upper ends by a rail 51 which steadies them and holds them in proper alignment.

The wrist pin projects at opposite ends beyond the respective cross heads and upon the projecting ends of the wrist pin the upper ends of connecting rods 52 and 53 are pivoted. The connecting rods are retained in position by means of collars 54, 55 secured to the wrist pin. The lower ends of the connecting rods pass down through suitable openings 56, and 57 (Fig. 4), in the lower head 3 and into the interior of the base 2 where they engage the crank pins 58 and 59. These crank pins are mounted between pairs of cranks 60 and 61 respectively fixed to the crank shaft.

The lower or head end of the piston is provided with one or more ports leading from its interior to its exterior. These ports preferably comprise passages 62 (Figs. 3 and 4) extending partly through the lining 32 and into the core 27 of the piston and opening into an annular recess 63 in the lower end of the piston. Preferably the passages 62 open into the expansion chamber 31 in the piston at the point where the side walls of the piston meet the bottom or head thereof. Within the annular recess 63 a ring-like or annular valve 64 (Figs. 3, 4, 12 and 13) is arranged. This valve is reciprocable vertically relatively to the piston and is adapted simultaneously to close or open the several ports or passages leading from the interior of the piston.

In order to avoid the lubrication troubles incident to the use of a reciprocating valve of ordinary type, the valve 64 (Figs. 10 and 12) is made to fit loosely within the recess 63 so that when in the upper part of the latter, the valve has but slight frictional engagement with the side walls thereof. In order to secure a tight fit when the valve is in closed position, the interior wall of the recess at the point or points where the passages 62 open into the latter is provided with inclined faces 65 (Figs. 3, 4, 10 and 11) which converge toward the outer wall of the recess thus restricting the entrance opening into the recess at such points. The main body of the valve 64 is of a radial thickness no greater than the width of the entrance opening of the means of the restricted or narrowed path thereof, but is provided at points corresponding to the surfaces 65 with thickened portions having inclined walls 66 (Fig. 10) adapted to engage the inclined walls 65 of the recess and to wedge the valve ring 64 as the latter is reciprocated toward the entrance to the recess. With this arrangement, downward movement of the valve ring causes the surfaces 66 to engage the surfaces 65 with greater and greater pressure as the valve approaches its closed position, thus providing a very close joint between the parts and preventing leakage through the valve port. On the other hand when the valve is lifted, it immediately separates from the opposed surfaces of the recess and is entirely free therefrom when it is fully opened so that but little friction is occasioned in reciprocating the valve.

The valve ports, if several are employed, are preferably spaced symmetrically about the piston and the thickened portions of the valve ring are of a circumferential extent slightly less than the circumferential extent of the spaces between the inclined surface 65 of the recess. As shown in the present drawings (Fig. 8), four ports are provided at substantially 90° apart. In introducing the valve ring into its recess the thickened portions thereof are placed opposite the spaces between the valve ports, and the ring is then pushed into the recess whereupon it is given a partial rotation to bring its thickened portions opposite to the valve ports.

Figure 4:
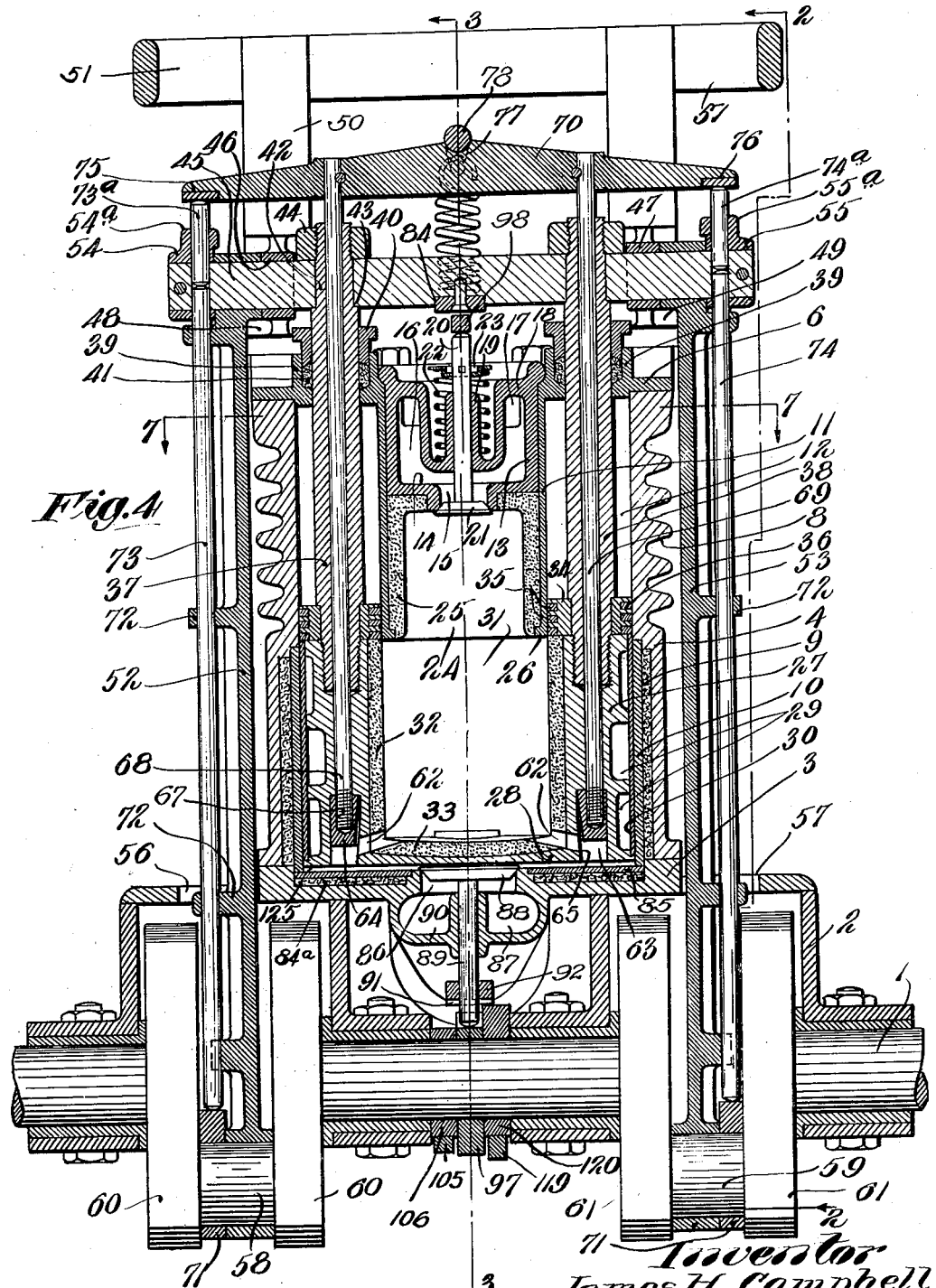
Fig. 4 is a vertical section on the line 4—4 of Fig. 2.
Figure 5:
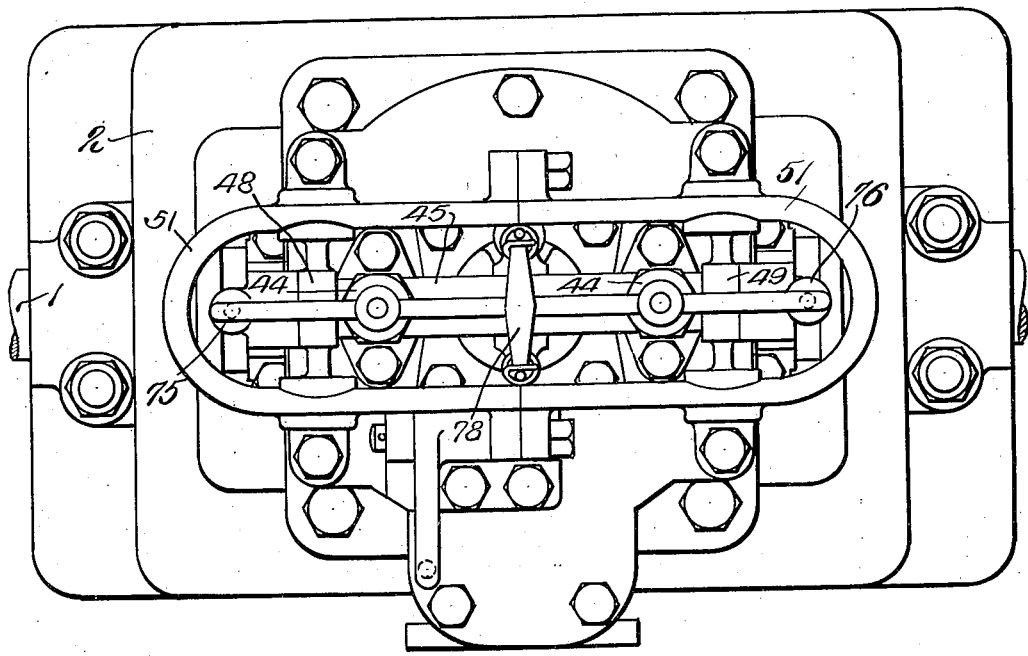
Fig. 5 is a top plan view of the engine.
Figure 7:
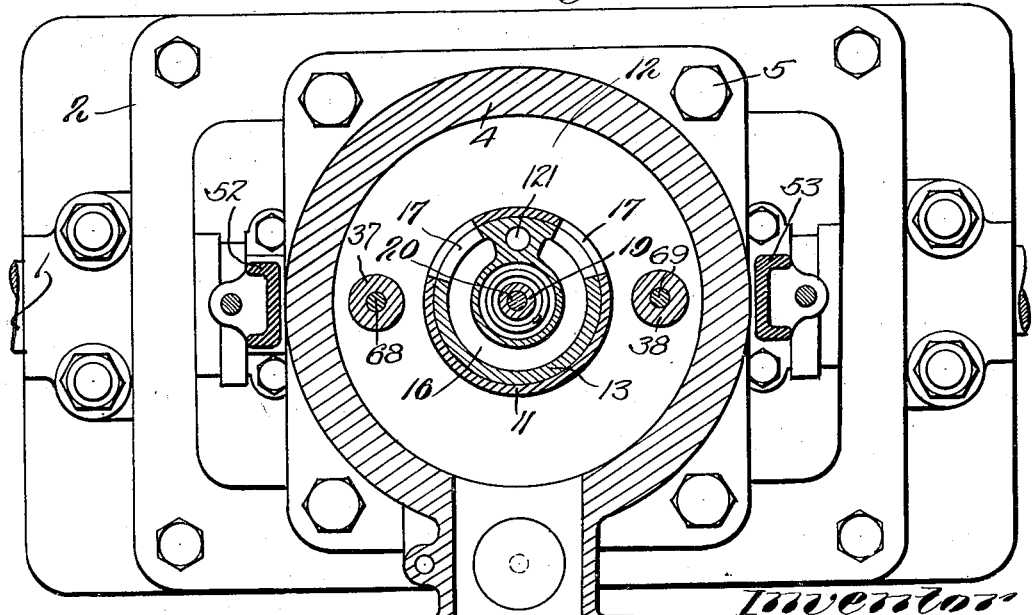
Fig. 7 is a horizontal section on the line 7—7 of Fig. 4.

At diametrically opposite points the valve ring is provided with internally threaded bores 67 for the reception of the lower ends of the valve rods 68 and 69 respectively. These valve rods pass upwardly through the tubular piston rods 37 and 38 respectively and at their upper ends are secured to a yoke bar 70 (Fig. 4). This yoke bar is arranged above the wrist pin 45 and extends substantially parallel to the latter, being spaced a sufficient distance therefrom to permit the desired reciprocating movement of the valve ring 64 relatively to the piston.

The relative movement of the valve with respect to the piston is produced by the following mechanism. Upon each of the crank pins 58 and 59 a cam 71 (Figs. 1 and 4) is secured. Each connecting rod is furnished with guide brackets 72 (Fig. 4) for guiding the tappet rods 73 and 74 respectively. These tappet rods extend longitudinally of the connecting rods and through diametral openings in the end portions of the wrist pin 45. Preferably the tappet rods are divided so that their upper portions 73ª and 74ª may move independently of the lower portions thereof. The joint between the upper and lower parts lies substantially in the horizontal plane of the axis of the wrist pin during the time that the tappet rod is subjected to end thrust, so that as the lower part of the tappet rod swings with the connecting rod its upper end bears with rolling pressure against the lower end of its upper part. The openings through the wrist pin may be widened at their lower portions to permit slight swinging of the lower part of the tappet rod with relation to the wrist pin without cramping the rod. Preferably the upper end portions 73ª and 74ª of the tappet rods are guided in openings in brackets 54ª and 55ª, forming parts of the collars 54 and 55. The upper extremities of the tappet rods engage the lower surface of the yoke bar 70 at its ends 75 and 76 respectively.

At its center the yoke bar 70 is provided with a notch 77 in which an evener lever 78 is fulcrumed. This evener lever is provided with hooked extremities 79 and 80 to which the upper ends of springs 81 and 82 are attached. The lower ends of the springs are secured to the hooked extremities 82ª and 83 respectively of a bracket 84 (Fig. 3) which is secured to the under side of the wrist pin 45, the latter being squared at its central portion for the convenient attachment of the bracket 84. By the employment of the evener lever 78, any inequalities in the springs 81 and 82 are compensated for as the evener lever 78 may swing about its fulcrum in accordance with relative tension of the two springs, thus causing the heavier spring to act with less leverage so that substantially no side thrust upon the yoke bar is developed. The springs 81 and 82 tend to move the yoke bar downwardly, while the cams 71 sustain the weight of the yoke bar and the tappet rods. The valve is normally held open by the cams while the springs close the valve when permitted so to do.

The lower head 3 of the cylinder (Figs. 3 and 4) is preferably provided with a recess filled with heat insulating material 84ª retained in place by a cover plate 85 and is furnished with a central exhaust port 86 opening into a passage 87 which extends laterally through the base and which may communicate with any desired exhaust conduit not shown.

A valve 88 (Figs. 3 and 4) normally closes the port 86, this valve being provided with a stem 89 which is suitably guided in a bracket 90 90 forming a portion of the lower head. The valve stem projects downwardly into the base and is furnished with a transverse pin 91; upon which the forked extremity of a lever 92 bears. This lever is fulcrumed at the point 93 upon a pin carried by a bracket 94 mounted upon the base member, and is furnished with opposed lugs 95 upon which compression springs 96 are supported. These springs bear against the under surface of the head 3 and thus constantly tend to hold the valve 88 in closed position. The lower end of the stem 89 rests upon a cam 97 mounted upon the shaft 1 within the base. This cam is properly shaped to raise the valve at the desired intervals in the cycle of operations to open the exhaust port 86.

The valve stem 20 is depressed at the proper times to open the valve 21 by means of an arm 98 (Fig. 3) of a lever fulcrumed upon a shaft 99. The lever is provided with a second arm 100 which bears upon the upper end of a tappet rod 101. This tappet rod is guided in a bracket 102 (Figs. 1 and 3) secured to the cylinder wall and also at its upper and lower ends in suitable openings in the upper head and in the base member respectively. The lower end of the tappet rod 101 rests upon an arm 103 of a lever fulcrumed upon a shaft 104. The lever has a second arm 105 which bears upon a cam 106 carried by the crank shaft. This cam has a suitable peripheral configuration to actuate the connections and open the valve 21 at the proper intervals.

The upper portion of the cylinder is provided with a lateral offset 107 (Fig. 3) having a passage 108 leading into the annular compressor chamber 12. This passage communicates with a port 109 hereinafter termed the primary inlet port, which is normally closed by a valve 110 carried by a valve stem 111. The port 109 opens into a passage 112 which may be connected with a conduit (not shown) leading to a source of fuel supply, such for example as a carbureter. Preferably the offset 107 terminates in a flange having openings 113 (Fig. 1) to which the flanged extremity of the supply conduit may be bolted.

The valve stem 111 passes through a guide opening in an extension 114 of the member 107 and is provided with a collar 115 upon which the lower end of a compression spring 116 rests. The upper end of the spring bears against the lower surface of the member 107 and thus normally tends to hold the valve 110 closed. The lower end of the valve stem rests upon the upper end of a valve rod 117 suitably guided in the bracket 102 and in an opening in the base 2. The lower end of this rod rests upon one arm 118 of a lever pivotally supported upon the shaft 104 and having a second arm 119 (Figs. 1, 4 and 6) which bears against a cam 120 mounted on the crank shaft. The latter cam is preferably shaped to open the valve 110 at the desired intervals.

Figure 3:
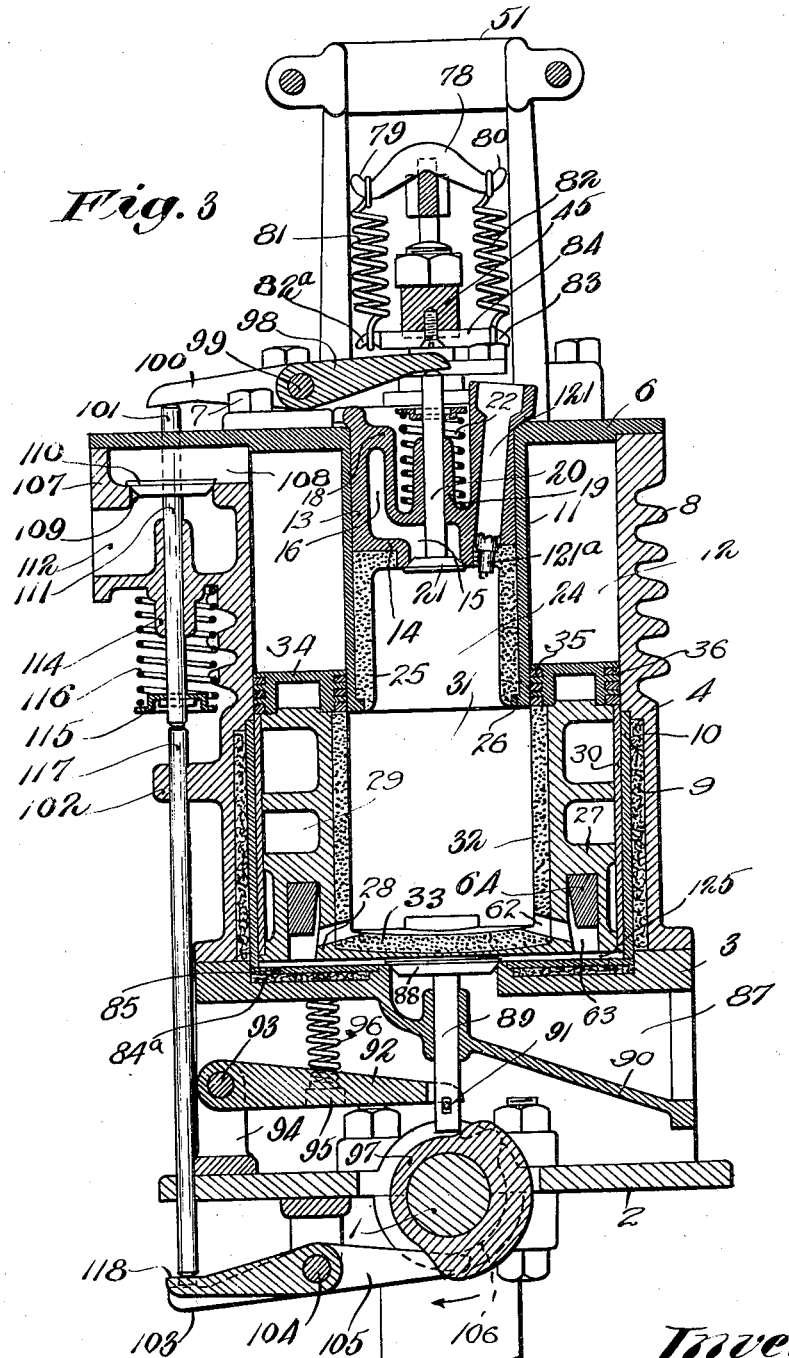
Fig. 3 is a vertical section on the line 3—3 of Figs. 1 and 4.

The passages 62 leading from the interior of the piston terminate as above stated in the recess 63. The latter in turn opens at the under surface of the head of the piston into a secondary expansion chamber 125 (Fig. 3). This chamber is of the full diameter of the interior of the cylinder, and its diameter is greater than that of the primary combustion chamber 31 by twice the thickness of the piston wall. In other words the bottom wall of the primary combustion chamber 24 has a much smaller area than the upper wall of the secondary expansion chamber 125, such bottom and top walls respectively constituting the upper and lower acting surfaces of the piston head. The exhaust port 86 as above stated opens from the secondary expansion chamber 125. The ring 34 at the upper edge of the piston which carries the piston packing rings, constitutes the plunger of a compressor comprising the annular chamber 12, so that the single piston provides a movable wall for the compressor chamber 12, the primary expansion chamber 31 and the secondary expansion chamber 125.

As the combustion chamber 24 and the primary expansion chamber 31 are exposed to extremely high temperatures, they are provided with the refractory linings above described. These linings may be made of any suitable material such as above suggested capable of withstanding the corrosive action of the gaseous products of combustion at the high temperature developed by the explosion. As the piston rods 37 and 38 are disposed within the annular chamber 12 of the compressor which receives the unburnt charge, they are not unduly heated so that there is no difficulty in properly lubricating them. Furthermore, the inner piston rings 35 engage the outer surface of the sleeve 11 where the latter is also exposed to the relatively cool gases in said chamber so that it is normally comparatively cool and the rings are not injured by contact therewith, and may readily be lubricated. The outer rings 36 engage the inner surface of the outer wall of the cylinder at its upper part where it is comparatively cool and where the radiating ribs 8 are provided which help to prevent overheating of the cylinder at this point. The main portion of the piston need not fit with a gas-tight joint against the walls of the sleeve 11, as the packing rings prevent leakage at all points. It is thus substantially unnecessary to lubricate the lower parts of the piston. As the latter are of cellular construction and as the walls of the cylinder are heat insulated, there is little heating of the outer wall of the cylinder at its lower part, and the heat developed by the explosion is kept within the combustion and expansion chambers where it performs useful work in expanding the gas.

The relative movement between the annular valve 64 which is carried by the piston and the piston itself is obtained in a simple manner by mounting the valve actuating cam upon the crank pin which drives the piston, although it is contemplated that the cam might be mounted upon some other part turning in time with the crank pin.

As herein disclosed all of the valves of the engine are operating directly from the crank shaft without the employment of separate cam shafts or similar connections. It is thus possible to simplify the structure and to secure extreme accuracy in timing of the various parts.

The operation of the device is substantially as follows reference being had particularly to Figs. 14 to 21 inclusive. In Fig. 14 the parts occupy the position at which the explosion takes place. In this position the primary inlet valve 110 is closed, the piston P is substantially at the upper limit of its movement, the secondary inlet valve 21 is closed, the annular valve 64 is closed, and the exhaust valve 88 is open. The combustion chamber 24 contains an explosive gaseous mixture under high compression and the secondary expansion chamber 125 is filled with the expanded and partially cooled products of combustion from the previous charge. With the parts in this position the charge in the chamber 24 is ignited and the pressure thus generated acts upon the inner surface of the piston head at the bottom of the primary expansion chamber 31 and moves the piston downwardly on its forward working stroke.

As the piston starts to move down the primary inlet valve 110 is opened as shown in Fig. 15, the other valves remaining in the same position as in Fig. 14. The downward movement of the piston forces the exhaust gases from the chamber 125 out through the valve 88 and at the same time the downward movement of the piston sucks in a fresh charge through the valve 110 into the annular compressor chamber 12. This action continues until the piston has arrived nearly at the bottom of the cylinder as indicated in Fig. 16 whereupon the valve 88 closes, thus entrapping a portion of the exhaust gas in the secondary expansion chamber 125 so that such gas acts as a cushion for the reciprocating parts as the piston approaches the end of its stroke.

During the latter part of the downward reciprocation of the piston on its forward working stroke the annular valve 64 is opened as shown in Fig. 17 to permit the partially expanded gases from the combustion chamber and the primary expansion chamber 31 to pass through the ports controlled by the valve 64 into the secondary expansion chamber 125 beneath the piston head. As the area of the under surface of the piston is much greater than the operative area of its upper surface as above described, the pressure of the partially exhausted gases within the chamber 125 is immediately sufficient to move the piston upwardly on its return working stroke.

Simultaneously with or soon after the initiation of the return stroke of the piston, the valve 110 is closed, and as the piston rises the fresh charge within the compressor chamber 12 is compressed. This action continues until the piston has made about five-eighths of its return stroke whereupon the secondary inlet valve 21 is opened as shown in Fig. 19. The opening of this valve occurs at a time when the pressure in the compression chamber is substantially equal to the pressure in the combustion chamber and the two expansion chambers, and as the piston continues on in its return stroke the compressed charge is transferred from the chamber 12 into the combustion chamber thereby forcing out the remainder of the exploded charge from the latter, until the combustion chamber is substantially filled with the fresh charge, whereupon the annular valve 64 closes as shown in Fig. 20, such closure taking place when the piston has made substantially three-fourths of its return stroke. The piston now continues on its upward or return stroke and just before it reaches the limit of its movement in this direction, the valve 21 closes. The gas entrapped in the upper part of the annular chamber 12 helps to cushion the blow of the reciprocating parts. At about this time the exhaust valve 88 opens, thus restoring the parts to the position shown in Fig. 14 where they are ready for the next ignition.

A general consideration of the above cycle of operations shows that the exploded charge acts twice, first to move the piston in one direction and then to move it in the other direction so that while the engine operates on a two stroke cycle, that is to say for each revolution of the crank shaft there is one explosion in the cylinder, the crank shaft nevertheless receives two impulses during each revolution whereby a much more uniform turning effort is applied to the crank shaft than in any usual type of engine of the internal combustion type.

As no attempt is made to cool the walls of the combustion and expansion chambers, but on the contrary, these walls are insulated to prevent loss of heat, substantially the entire heat of the explosion is transferred into useful work, and the necessity for providing artificial cooling devices, such for example as fans, water circulating systems, and other accessory appliances is avoided.

As that portion of the piston which carries the packing rings works in a part of the cylinder which is not exposed directly to the heated products of combustion, lubrication is facilitated and the life of the packing rings greatly prolonged while leakage of gas past the packing is substantially eliminated.

Another desirable result obtained by the employment of the mechanism described is the cushioning of the reciprocating parts in both directions of reciprocation. This cushioning is accomplished by entrapping a portion of the gas in the ends of the cylinder, and the energy consumed in compressing this gas as the reciprocating parts are brought to rest is restored to the system as the parts start on the next reciprocation so that substantially no energy is lost and the wear upon the bearings and other parts is very greatly reduced.

Another desirable feature of the present device is the complete separation of the crank case from the cylinder. This effectually prevents contamination of the oil in the crank case by seepage of fuel from the cylinder and also prevents oil from passing up into the cylinder where it is a common cause of carbonization.

A further desirable feature is the arrangement of the exhaust valves for both expansion chambers at points near the bottoms of said chambers so that any dust or other solid material resulting from wear is blown out with the exhaust gases and does not accumulate in the expansion chambers.

I claim:

1. An internal combustion engine having a cylinder and a cylindrical piston reciprocating therein, said piston comprising a core having circumferential channels in its exterior surface, a cylindrical shell embracing the core and closing the channels and forming the outer surface of the piston body, and a cup-like refractory lining within the core.

2. An internal combustion engine having a cylinder and a hollow cylindrical piston reciprocating therein, said piston comprising a chambered cylindrical core, a refractory lining for the inner surface of the core, and a thin cylindrical shell closely embracing the core and forming the outer surface of the piston body.

3. An internal combustion engine comprising a cylinder, a cylinder head having a central opening, a sleeve coaxial with the opening and projecting into the cylinder, the annular space between the cylinder wall and said sleeve constituting a compression chamber for the explosive gaseous mixture, a closure for the outer end of the sleeve provided with an inlet port communicating with the annular compression chamber, a valve for controlling the port, and means for actuating the valve, the inner portion of the sleeve defining a combustion chamber into which the inlet port opens.

4. An internal combustion engine comprising a cylinder, a head therefor, said head having a sleeve projecting into the cylinder concentric with the latter and open at its inner end, a refractory lining for the inner part of the sleeve, such inner part constituting a combustion chamber, and means closing the outer end of the sleeve provided with a passage for the admission of a combustible charge to the combustion chamber.

5. An internal combustion engine comprising a cylinder, a piston reciprocable therein, an elongated sleeve fixed at one end of the cylinder and projecting into the latter, the annular space between the cylinder wall and the sleeve constituting a compression chamber, the inner end of the sleeve being open to the cylinder and constituting a combustion chamber, a refractory lining for said chamber, a member closing the outer end of the sleeve, said member having a centrally disposed passage for admitting a combustible charge to the combustion chamber, a valve normally closing said passage, and means for opening said valve.

6. An internal combustion engine having a combustion chamber, and an annular compression chamber concentric with and surrounding the combustion chamber, a piston comprising a head exposed to pressure in the combustion chamber and an annular body having a surface acting as a compressor plunger in the compression chamber, and a piston rod secured to said annular body and passing lengthwise of said compression chamber.

7. An internal combustion engine having a cylinder, a piston reciprocating therein, the piston having a head and an annular body, a sleeve definining a combustion chamber coaxial with the cylinder, said sleeve projecting into the interior of the body of the piston, packing carried by the piston adjacent to the free edge of the body thereof engaging the outer face of the sleeve and the inner surface of the cylinder respectively, a crank shaft, and connections comprising a part disposed between the sleeve and cylinder wall for transmitting movement of the piston to the crank shaft.

8. An internal combustion engine having a cylinder, a hollow member disposed within the cylinder providing a combustion chamber, said member being spaced from the interior of the cylinder to provide a compression chamber for a combustible gaseous charge, means for compressing a charge in the latter chamber, a port for admitting a charge to the compression chamber, and a port permitting the transfer of the compressed charge from the compression chamber to the combustion chamber, a valve for closing each of said ports, and mechanically actuated means for opening said valves.

9. An internal combustion engine having a cylinder, a combustion chamber therein, a compression chamber surrounding the combustion chamber, a secondary expansion chamber, a single piston reciprocating in the cylinder having surfaces exposed to pressure existing in each of said chambers, and a piston rod secured to the piston and extending through the compression chamber.

10. An internal combustion engine having a cylinder, an annular compression chamber at one end of the cylinder, a secondary expansion chamber at the opposite end of the cylinder, a piston reciprocating in the cylinder having a hollow annular body providing a primary expansion chamber, and a piston rod attached to the annular body of the piston and extending through the compression chamber.

11. An internal combustion engine having a cylinder, a cylindrical sleeve projecting into the cylinder at one end, the interior of the sleeve constituting a combustion chamber and the annular space between the sleeve and the inner surface of the cylinder constituting a compression chamber for the reception of a combustible gaseous charge, a hollow piston reciprocating in the cylinder and telescoping over the sleeve, the free edge of the piston body constituting a movable wall for the compression chamber, a valved port through which a gaseous charge is drawn into the compression chamber as the piston moves in one direction, and a valved port through which the compressed charge is delivered to the combustion chamber as the piston moves in the opposite direction and a piston rod secured to the piston and extending through the combustion chamber.

12. An internal combustion engine having a cylinder, a hollow piston reciprocating therein, said piston comprising an annular body and a head and having a port leading from its interior to its exterior, a pair of hollow piston rods attached to the annular body of the piston, a valve disposed in a recess in the piston, and means within the hollow piston rods for moving the valve relatively to the piston to open and close the port.

13. An internal combustion engine having a cylinder, a piston reciprocating therein, said piston comprising an annular body and a head and having a port leading from its interior into an annular recess in the outer face of the head, a ring-like valve disposed in said annular recess, and means extending longitudinally through the annular body of the piston for moving the valve relatively to the piston for opening and closing said port.

14. An internal combustion engine having a cylinder, a cup-like piston reciprocating therein, said piston comprising a head and an annular body, the piston having an annular recess in the outer surface of its head and a plurality of ports leading from the interior of the piston into said recess, said ports being spaced circumferentially of the piston, an annular valve within the recess, and means for moving the valve relatively to the piston for simultaneously closing all of said ports.

15. An internal combustion engine having a cylinder, a piston reciprocating therein, said piston having a port therein, a valve reciprocable in a recess in the piston to open and close the port, said valve having a loose fit in the recess when open but gradually becoming tighter as it is moved toward port closing position.

16. An internal combustion engine having a cylinder, a piston reciprocating therein, said piston having a passage and a recess, the recess having a portion provided with substantially parallel walls and a portion provided with converging walls, and a valve reciprocable within the recess, said valve being loose when located between the parallel walls of the recess and fitting snugly between the converging walls of the recess.

17. An internal combustion engine having a cylinder, a piston reciprocating therein, the piston having a head and a port leading from one side of the head to the other, and a valve disposed in a recess in the piston and movable to close the port, said valve having a cam face engageable with a complemental surface of the recess to wedge the valve tight when closing the port.

18. An internal combustion engine having a cylinder and a piston reciprocating therein, the end of the piston being provided with a recess having substantially parallel walls at its inner end, one wall of the recess being inclined and converging toward the opposite wall at the outer end of the recess, the piston having a passage opening into the recess through the inclined wall of the latter, and a valve reciprocable in the recess, said valve having an inclined face which engages and snugly fits against the inclined face of the recess when positioned in the outer portion of the latter but which is substantially free from engagement with the wall of the recess when the valve is moved to the inner end of the latter.

19. An internal combustion engine having a cylinder and a piston therein, said piston having an annular recess in its end, spaced passages opening into said recess, the inner wall of the recess in the neighborhood of the passages converging toward the opposite wall whereby the entrance to the recess is narrowed at such points, an annular valve disposed in the recess, said valve having thickened portions provided with inclined faces engageable with the inclined surfaces of the recesses, and other portions of less width than the main part of the recess, the several portions of the ring being so disposed as to permit its thickened parts to pass into the recess between those parts of the latter where its entrance is narrowed and thereafter by a partial rotation to be retained against accidental removal from the recess.

20. An internal combustion engine having a piston comprising a head and an annular body, a tubular piston rod attached to the annular body of the piston, a valve controlling a port in the piston, and a part disposed within the piston rod and movable longitudinally thereof for actuating the valve.

21. An internal combustion engine having a cylinder, a piston comprising a head and an annular body portion, said piston having a port, a valve for closing the port, a hollow piston rod connected to the body portion of the piston, a rod extending through the piston rod for actuating the valve, and means for moving the valve rod relatively to the piston rod.

22. An internal combustion engine having a piston provided with a port leading from one side to the other thereof, an annular valve concentric with the piston for closing the port, a pair of tubular piston rods secured at diametrally opposite points to the piston, and means extending through the rods and connected to the valve for moving the latter axially of the piston to open the port.

23. An internal combustion engine provided with a piston having a plurality of passages therein, an annular valve movable longitudinally of the piston to open and close all of the ports simultaneously, a pair of parallel valve rods connected to the valve at diametrally opposite points, and a yoke connecting said rods.

24. An internal combustion engine having a reciprocating piston provided with a passage therein, a valve for closing the passage, a pair of tubular piston rods, a valve rod sliding in each piston rod, one end of each valve rod being secured to the valve, and the opposite ends of the valve rods projecting beyond the ends of the respective piston rods, a yoke connecting the projecting ends of the valve rods, and means for reciprocating said yoke.

25. An internal combustion engine comprising a cylinder having therein an expansion chamber adjacent to one end and a combustion chamber adjacent to the opposite end, a piston reciprocating therein, said piston separating the combustion chamber from the expansion chamber, a port in the piston extending from the front to the rear thereof, a normally closed valve for controlling the port, a hollow piston rod, a valve rod inside of the piston rod, and cam means for actuating the valve rod to hold the valve open during a part at least of the return stroke of the piston.

26. An internal combustion engine comprising a cylinder having a compression chamber and a combustion chamber at one end and an expansion chamber at the other, a piston reciprocating in the cylinder, said piston having a port leading from one side to the other thereof, a valve controlling said port, valves controlling ports leading into the compression chamber and from the latter to the combustion chamber, a valve controlling an exhaust port leading from the expansion chamber, and a crank shaft actuated by the piston, and means carried by the crank shaft for opening and closing the several valves in properly timed relation.

27. An internal combustion engine comprising a cylinder, a wrist pin extending transversely of the cylinder at one end of the latter, a crank case at the opposite end of the cylinder, a cover for the crank case constituting the lower head of the cylinder, a crank shaft within the crank case, a piston reciprocating in the cylinder, and a connecting rod exterior to the cylinder for transmitting movement from the wrist pin to the crank shaft.

28. An internal combustion engine comprising a cylinder, a wrist pin extending transversely of the cylinder adjacent to one end thereof, a crank case at the opposite end of the cylinder, a crank shaft within the crank case, the cylinder having compression and combustion chambers therein, a piston reciprocating in the cylinder, a piston rod secured to the piston and extending to the upper end of the cylinder, means connecting the piston rod to the wrist pin, and a connecting rod disposed outside the cylinder for transmitting movement from the wrist pin to the crank shaft.

29. An engine of the class described comprising a cylinder normally closed at both ends, a fixed guide sleeve concentric with the cylinder and projecting into the latter at one end, a cup-like piston within the cylinder, said piston having a head and side walls, the side walls fitting between the guide sleeve and the inner surface of the cylinder, refractory material lining the inner surface of the guide sleeve and the inner surface of the piston, means for introducing a combustible charge into the space limited by the inner walls of the guide sleeve and piston, means for firing such charge, a crank shaft, and means for transmitting movement from the piston to the crank shaft.

30. An engine of the class described comprising a cylinder normally closed at both ends, a fixed guide sleeve projecting inwardly from one end of the cylinder and concentric with the latter, a hollow piston within the cylinder, said piston having a head and annular side walls, the side walls fitting into the space between the guide sleeve and the inner surface of the cylinder, the walls of the piston having inner and outer annular grooves, ring members within said grooves adapted to make a tight sliding fit with the sleeve and inner wall of the cylinder, respectively, and a refractory lining for the sleeve and for the piston head and walls.

Signed by me at Boston, Massachusetts this 13th day of December 1923.

JAMES H. CAMPBELL.